United States Patent [19]

Rosen

[11] 4,009,981
[45] Mar. 1, 1977

[54] UNIVERSAL MOLD TOOLING SYSTEM FOR THERMOFORMING MOLDS

[76] Inventor: Stanley R. Rosen, 8 Gerardine Place, Spring Valley, N.Y. 10977

[22] Filed: Nov. 10, 1975

[21] Appl. No.: 630,154

[52] U.S. Cl. .............................. 425/388; 425/384; 425/405 R; 425/DIG. 48
[51] Int. Cl.² ........................................ B29C 17/00
[58] Field of Search .......... 425/387 R, 388, 405 R, 425/416, DIG. 48, 384

[56] References Cited
UNITED STATES PATENTS

| | | | |
|---|---|---|---|
| 2,926,385 | 3/1960 | Willson | 425/388 X |
| 3,058,154 | 10/1962 | Howard et al. | 425/DIG. 48 |
| 3,161,915 | 12/1964 | Thiel | 425/388 X |
| 3,166,790 | 1/1965 | Keyes | 425/388 X |
| 3,358,061 | 12/1967 | Gidge et al. | 425/DIG. 48 |
| 3,394,208 | 7/1968 | Lovas et al. | 425/388 X |
| 3,496,607 | 2/1970 | Laison | 425/388 X |
| 3,516,122 | 6/1970 | Schwartz | 425/388 X |
| 3,518,334 | 6/1970 | Carrigan et al. | 425/384 X |
| 3,640,666 | 2/1972 | Jope et al. | 425/388 X |

Primary Examiner—J. Howard Flint, Jr.
Attorney, Agent, or Firm—Jacob B. Burke

[57] ABSTRACT

Thermoforming apparatus adapted to accommodate molds of different lengths to form molded parts in a horizontal web comprises a vertically movable support. A mold base assembly carried by the support includes a flat-topped rectangular basic mold base secured horizontally to the support. A plurality of flat-topped straight mold base extension segments are removably secured together in side-by-side relationship forming a rectangular array. The array is removably secured to the basic mold base and support. A first vertically movable straight gate is secured to the free end of the basic mold base. A second vertically movable straight gate is removably secured to the segment at the free end of the array. Any one or more segments along with the second gate can be removed from the mold base assembly without disturbing the basic mold base and remaining segments. The second gate can then be attached to the segment at the free end of the shortened array. A manifold for passing a fluid coolant through the basic mold base and segments is provided with detachable branches connected to as many segments as there are in an array thereof at any given time. A cooperating mold assist box over the mold base assembly contains removable assist bars which hold the web in place during molding. The box has a fixed end wall and movable end wall cooperating with the gates to hold the web in place during molding. By means of the movable end wall the box can be adjusted in length to conform with the length of the mold base assembly.

3 Claims, 7 Drawing Figures

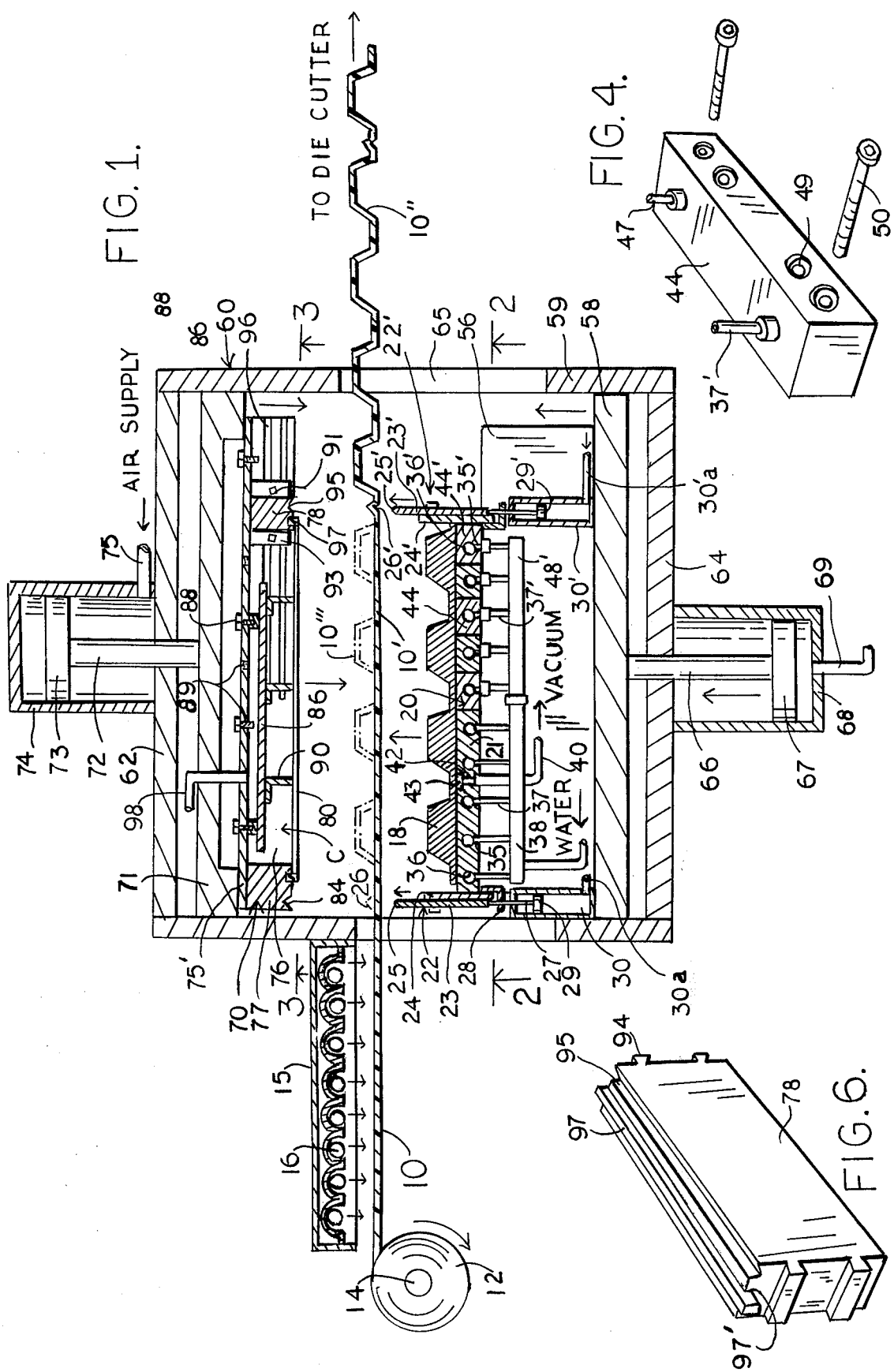

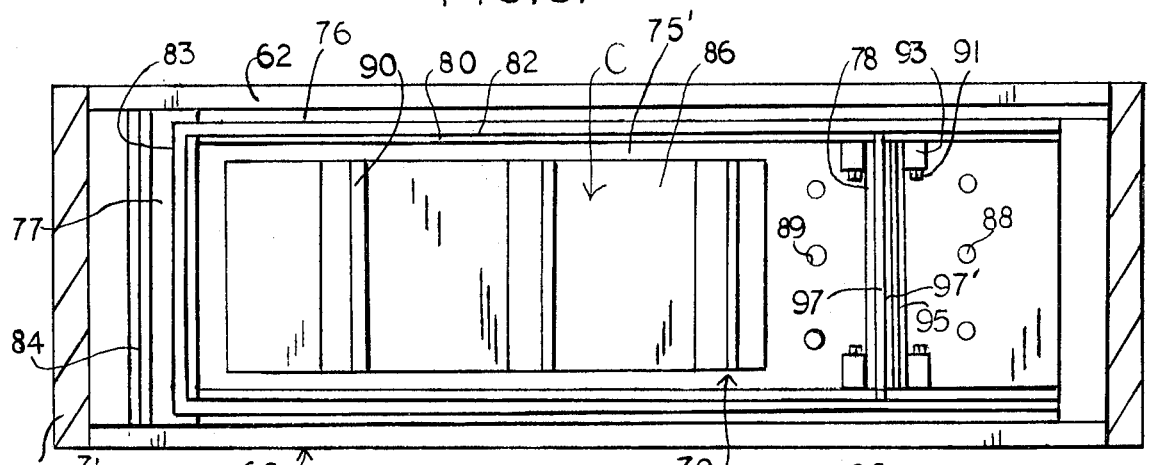
FIG. 3.
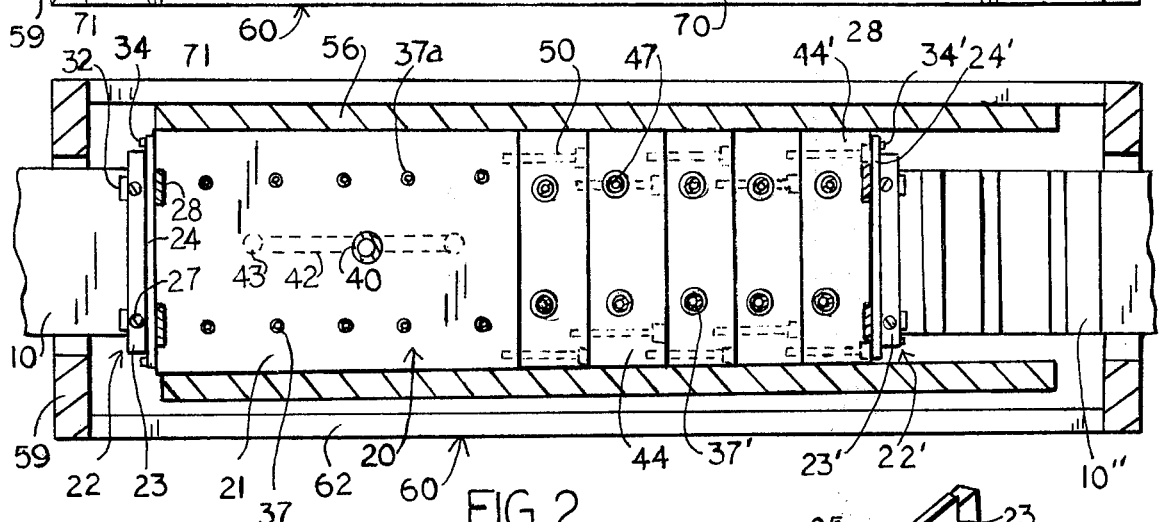
FIG. 2.
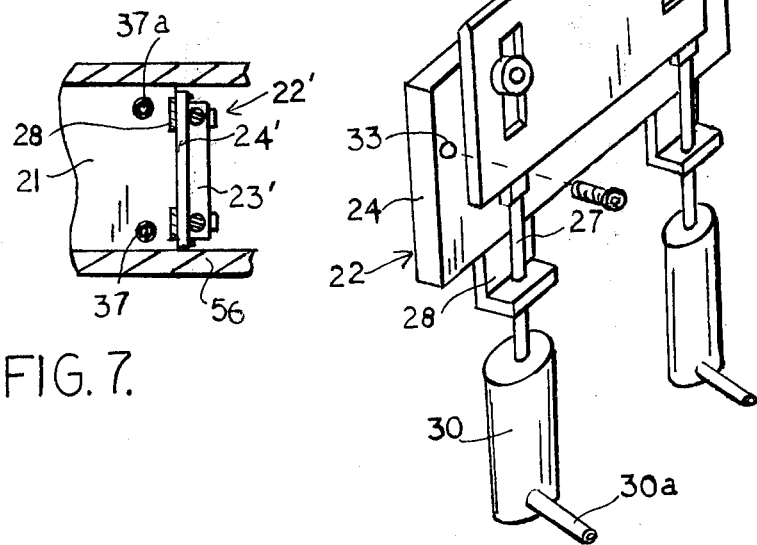
FIG. 5.
FIG. 7.

UNIVERSAL MOLD TOOLING SYSTEM FOR THERMOFORMING MOLDS

BACKGROUND OF THE INVENTION

1. Field of the Invention

This invention concerns a mold tooling system for thermoforming molds used in molding a plastic web by vacuum forming or pressure forming parts of the web.

2. Description of the Prior Art

In conventional thermoforming machines for molding plastic webs or sheets, it is necessary to install a mold base of particular size and a molding assist box of corresponding size to cooperate with the mold base. The mold base provides a support for a mold of corresponding size. The mold base acts as a heat sink to draw heat from the mold which is continuously receiving heat from the heated plastic web. The mold base contains internal passages through which water passes to maintain the mold at predetermined molding temperature. Vacuum may be applied to the mold and plastic web through ports in the mold base, or gas pressure can be applied through a port in the molding assist box. Installation of a mold base, mold and molding assist box for molding parts of a web requires considerable costly setup time of highly skilled mechanics. For each different size mold, a mold base and molding assist box of corresponding size must be installed. For each thermoforming machine used for different size molds, it is necessary to stock a number of different mold bases and molding assist boxes of different sizes. These items are quite expensive, and as mentioned above, the labor cost of installation is high, and requires highly skilled mechanics.

SUMMARY OF THE INVENTION

The present invention concerns a universal tooling system in which a universal mold base assembly includes a basic mold base of minimum size which can be used with any size mold, and one or more water cooled mold base extension segments can be added to the basic mold base depending on the size of the particular mold. Movable gates are attached to the basic mold base or to the mold base and front extension segment to clamp the plastic web for preventing distortion of completely molded parts and to help strip molded parts from the mold. A water supply manifold is provided and arranged to quickly attach added mold extension segments to the water supply. The added segments can easily be installed by relatively unskilled operators. The basic mold base, when once installed does not have to be replaced for different size molds. The new system also includes a universal molding assist box which provides means to seal off the mold mounted on the mold base so that vacuum or pressure forming can take place. This box provides a support to which molding assist bars can be added to form the plastic parts free of molding defects. The universal molding assist box has a fixed end wall, fixed side and top walls, and a movable front end sealing wall or bar adjustable to accommodate any length mold installed in the molding machine. The gates carried by the mold base with or without extension segments engage the sealing bar and fixed end wall with the web therebetween to clamp the web during the molding process. Contrary to prior systems, the molding assist box need not be removed from the molding machine and replaced by another of different size for each different size of mold and mold base. The universal molding assist box has preset attachment points or centers for installing removable molding assist bars. By this arrangement, setup time is reduced and setup can be performed by relatively unskilled operators. Also the high costs of providing many molding assist boxes of different sizes are avoided. The labor and equipment costs of the present new universal mold tooling system may be only 20 or 30% of those incurred in prior mold tooling systems.

The above and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 1 is a vertical sectional view partially diagrammatic in form of a thermoforming molding apparatus including a mold tooling system embodying the invention.

FIG. 2 and FIG. 3 are enlarged horizontal sectional views taken on lines 2—2 and 3—3 respectively of FIG. 1.

FIG. 4 is a perspective view on an enlarged scale of an inverted mold base extension segment employed in the apparatus of FIG. 1.

FIG. 5 is a perspective view on an enlarged scale of a gate assembly employed in the apparatus.

FIG. 6 is a perspective view on an enlarged scale of an inverted sealing bar or wall employed in the molding assist box of FIGS. 1 and 3.

FIG. 7 is a fragmentary horizontal view similar to a portion of FIG. 2, showing a modification of the invention.

Referring now to the drawings wherein like reference characters designate like or corresponding parts throughout, there is shown in FIGS. 1, 2 and 3, thermoforming apparatus for a plastic web or sheet 10 supplied in a feed or supply roll 12 carried by a horizontal supporting shaft 14. The web passes horizontally under a bank 15 of heater elements 16 which preheat the web prior to passing it over mold 18. The mold is supported on mold base assembly 20.

The mold base assembly 20 shown in FIGS. 1 and 2 includes a rectangular basic mold base 21 which is a massive, rigid, flat platform at the rear end of which is mounted gate assembly 22. The gate assembly includes a mounting plate 24 attached to mold base 21. Gate 23 is carried by plate 24 and is vertically movable thereon. The gate is a straight flat plate having an upper beveled edge 25 (see FIG. 5) for forming an indexing indentation in plastic web 10. The gate is connected to bars or rods 27 extending through brackets 28 on plate 24 and secured to pistons 29 movably located in hydraulic cylinders 30 to which air under pressure is supplied via pipes 30a for raising the gate. The gate is pushed down during operation of the system against air pressure in the cylinders. Gate 23 has slots 31 in which are slide bolts 32 secured to plate 24 for guiding the gate during vertical movement. Holes 33 in plate 24 receive bolts 34 by which the gate assembly is secured to the end of mold base 21. In the mold base are passages 36 having inlets 35 which communicate with a manifold 38 via pipes 37. Alternatively pipes 37 can be omitted and the manifold may have its openings directly sealed to and communicating with inlets 35. The manifold supplies water or other fluid coolant of controlled temperature from a water supply to cool the mold base. A vacuum source may be connected via pipe 40 to the mold base and communicates with passages 42 in the mold base terminating in holes 43 for creating a vacuum under the plastic web during the molding process. The water drains out of drain openings 37a.

Mold base extension segments 44 are removably mounted on mold base 21. The segments are juxtaposed to each other and to the basic mold base. Each segment has an inlet 35' connected by a quickly attachable branch pipe 37' to manifold extension 48'. The inlets communicate with passages 36' in the segments. The water circulating through passages 36 and 36' in the basic mold base and segments is drained out via drain pipes 47; see FIG. 4. When any segments 44 are removed to shorten the mold base assembly unused branch pipes 37' can easily be capped.

Each of segments 44 has two pairs of holes 49 which receive bolts 50. The bolts secure one segment to the front end of the mold base. Other bolts secure each other segment to the adjacent rear one; see FIG. 2. Removably secured to the front segment 44' by bolts 34' is front gate assembly 22' similar to gate assembly 22. Gate 23' carried by plate 24' is movable vertically by pistons 29' in hydraulic cylinders 30' supplied with compressed air via pipes 30'a. If segments 44 and 44' are removed, gate assembly 22' can be attached to the front end of mold base 21 as shown in FIG. 7. Front gate assembly 22' can be attached to any one of segments 44. Gate 23' is a straight flat plate with an upper beveled edge 25' which will engage web 10 and cooperate with gate 23 to hold web 10 stationary during the molding process while web part 10''' shown in dotted lines is being molded.

Any required number of segments 44 in addition to the front segment 44' can be employed depending on the length of mold 18 mounted on the mold base and mold base extension segments. Mold 18 is secured by bolts or clamps not shown. A different mold will of course be used for each different pattern part to be molded in web 10. The minimum length of the mold base assembly will be determined by the length of the basic mold base 21. To lengthen mold base assembly 20, one or more segments 44 will be added to the basic mold base. This is easily and quickly done and requires no special mechanical skill.

Mold base assembly 20 is carried by a pair of vertical side plates 56 which rest on a platform 58. Cylinders 30, 30' are secured to the platform. Opposite ends of the platform slidably contact front and rear walls 59 of stationary machine frame 60. Cross plates 62 and 64 join walls 59 at top and bottom of the frame. Web 10 passes through openings 65 in walls 59. Platform 58 carrying mold base assembly 20 is connected by shaft 66 to piston 67 in hydraulic cylinder 68 secured to plate 64. When air or liquid is supplied via pipe 69 to cylinder 68, the entire platform, mold assembly, gates and mold are raised toward web 10.

In FIGS. 1 and 3 is shown a molding assist box 70 which is open at the bottom. It cooperates with mold base assembly 20, and with the gate assemblies 22, 22'. Box 70 is carried by platform 71 and moves with it in machine frame 60 between walls 59. The platform and assist box are connected by shaft 72 to piston 73 in hydraulic cylinder 74. When air or liquid is fed to cylinder 74 via pipe 75 the platform and assist box are raised. They are lowered by their own weight when the fluid is controllably released from cylinder 74.

Assist box 70 has a horizontal top wall 75', side walls 76, and rear end wall 77 all secured together. A movable front wall 78 or bar is adjustably mounted between side walls 76. At the bottom of walls 76, 77 is a sealing gasket 80 set in grooves 82, 83. A groove 84 at the bottom of rear wall 77 is aligned with and receives the beveled edge 25 of gate 23 for holding the web in place during the molding process. Mounted inside box 70 is a removable horizontal molding assist plate 86 supported by bolts 88 set in holes 89 in top wall 75. This assist plate carries vertical molding assist bars 90. The length of the molding assist plate and the number of assist bars will depend on the length and pattern of the mold 18. This plate and assist bars can be quickly installed and removed for replacement by others of different length of spacing. The molding assist plate and bars prevent molding defects from occurring when the molding assist box is lowered over the mold. Movable front wall 78 is a rigid, generally rectangular plate or bar best shown in FIG. 6. The wall has dovetail tongues 94 at opposite ends engaging in corresponding grooves 96 in side walls 76 of the box for support and for easy sliding adjustment. Clamp bars 93 secured by bolts 91 hold the front wall 78 in place on side walls 76. A groove 95 at the bottom of movable wall 78 receives the beveled edge 25' of gate 23' for clamping the front end of web part 10' which is to be molded, and for holding the web in place during the molding process. Wall 78 also has a resilient sealing gasket 97 set in a groove 97' and extending perpendicular to walls 76. Gaskets 80 and 97 seal box 70 and hold web portion 10' tightly against mold 18 while vacuum is applied below the web between mold 18 and web portion 10' during vacuum forming. The top of chamber C in box 70 above web portion 10' is then open to atmosphere via open holes 89.

If the machine is to be used for pressure forming the web, air or gas will be supplied under pressure via pipe 98 to chamber C. Gaskets 80 and 97 will then seal chamber C and maintain the pressure during the molding process. The space under the web can be open to atmosphere via pipe 40 during the pressure molding process.

The universal molding assist box 70 provides a support with predetermined centers or mounting points at holes 89 to permit quick installation and removal of the molding assist bars and plate. Movable front wall 78 quickly and easily adjusts the effective operative length of chamber C in box 70, so that setup time for use of the box with molds of different lengths is reduced. Nevertheless the molding assist bars and plate are set with precision in a very simplified manner.

In operation of the apparatus or machine, plastic web 10 coming off roll 12 drawn by mechanical means (not shown) passes under heater bank 15. The web is heated prior to passing over mold 18. Then movement of the web is stopped. Air is supplied to elevate gates 23, 23'. Then molding assist box 70 is lowered while mold 18 and mold base assembly 20 are raised to engage the gates with walls 77, 78 of box 70, with the web disposed therebetween. First the gates and end walls of box 70 engage the web and hold it stationary while mold 18 continues to rise with the mold base assembly until the mold contacts the web. Box 70 then seals web 10 with the mold base assembly enclosing web portion 10'. Since the gates engage and hold the web before the mold is applied, the previously molded warm web section 10" remains undistorted during the subsequent molding process.

Vacuum is applied between mold 18 and web portion 10', and the plastic web is thermally molded while cooling water of predetermined temperature circulates through mold base 20 and extension segments 44, 44' to cool the mold. Alternatively gas pressure is applied in chamber C to mold web part 10'. A soon as web part 10' is molded and set by partially cooling, the vacuum or pressure is released and box 70 is raised to release the web. Mold base assembly 20 is lowered while gates 23, 23' automatically help strip molded part 10''' from mold 18. Then the web is advanced the length of molded part 10''' toward a die cutting station, and the molding cycle is repeated. The web is advanced a distance equal to the distance between molded indentations 26, 26' formed by gates 23, 23'.

It will be noted that mold base assembly 20 can be easily and precisely lengthened or shortened to accommodate a longer or shorter mold 18. Chamber C in box 70 can correspondingly be easily lengthened or shortened by moving and clamping front wall 78. Wall 78 can be moved to the right or left as viewed in FIGS. 1 and 3. The assist bars and plate are also easily installed, precisely located and easily removed. Similarly, front gate assembly 22' can easily and quickly be removed and replaced by attachment to the mold base 21 or to the front mold base extension segment 44. No special skill is required to set up the machine for mounting a different mold, adding or removing mold base segments and replacing the gates.

It should be understood that the foregoing relates to only a preferred embodiment of the invention, and that it is intended to cover all changes and modifications of the

What is claimed is:

1. Thermoforming apparatus adapted to accommodate molds of different lengths to form molded parts in a horizontal web, comprising:
   a vertically movable support;
   a mold base assembly, comprising:
      a flat-topped rectangular basic mold base secured horizontally to said support,
      a plurality of flat-topped straight mold base extension segments,
      means for removably securing said segments together in side-by-side position to form a rectangular array of predetermined length, and
      means for removably securing one end of said array to one end of said basic mold base to define therewith a flat-topped horizontal platform for supporting a mold of desired length;
   a first vertically movable straight gate secured to the other end of said basic mold base and disposed to engage said web transversely;
   a second vertically movable straight gate;
   means removably securing said second gate to a front one of said segments at the other end of said array to engage said web transversely a predetermined distance from said first gate,
      whereby any number of said segments can be removed from said array to shorten said mold base assembly without disturbing the position of said basic mold base and the remaining segments in said array for supporting a different mold of different length, and whereby said second gate can then be secured to a remaining one of said segments at the other end of the shortened mold base assembly;
   a manifold assembly connected to said basic mold base, and having branch members removably connected to all of said mold base extension segments in said array for passing a fluid coolant through said basic mold base and said segments for cooling said mold on said mold base assembly while molding said web; and means for quickly detaching said branch members from those of said segments
      to be removed for quickly adjusting said manifold assembly in length corresponding to the length of the shortened mold base assembly.

2. Thermoforming apparatus as defined in claim 1, further comprising:
   a molding assist box vertically movable over said mold base assembly, said box having a closed top, side and end walls and open bottom, said end walls being arranged to engage upper free ends of said gates respectively for clamping said web therebetween, one of said end walls being movable laterally to adjust its spacing from the other one of said end walls;
   and means for disengageably clamping said one end wall of said box in place so that the effective length of said box can be adjusted and fixed with respect to the length of said mold base assembly defined by the distance between said first and said second gates.

3. Thermoforming apparatus as defined in claim 2, further comprising:
   a plurality of molding assist members removably mounted inside said box between said end walls and arranged to contact said web during molding thereof to prevent formation of molding defects therein.

* * * * *